Aug. 17, 1954  A. FRANKEL ET AL  2,686,653
STATOR COOLING OF GAS TURBINES
Filed Feb. 2, 1950  5 Sheets-Sheet 1

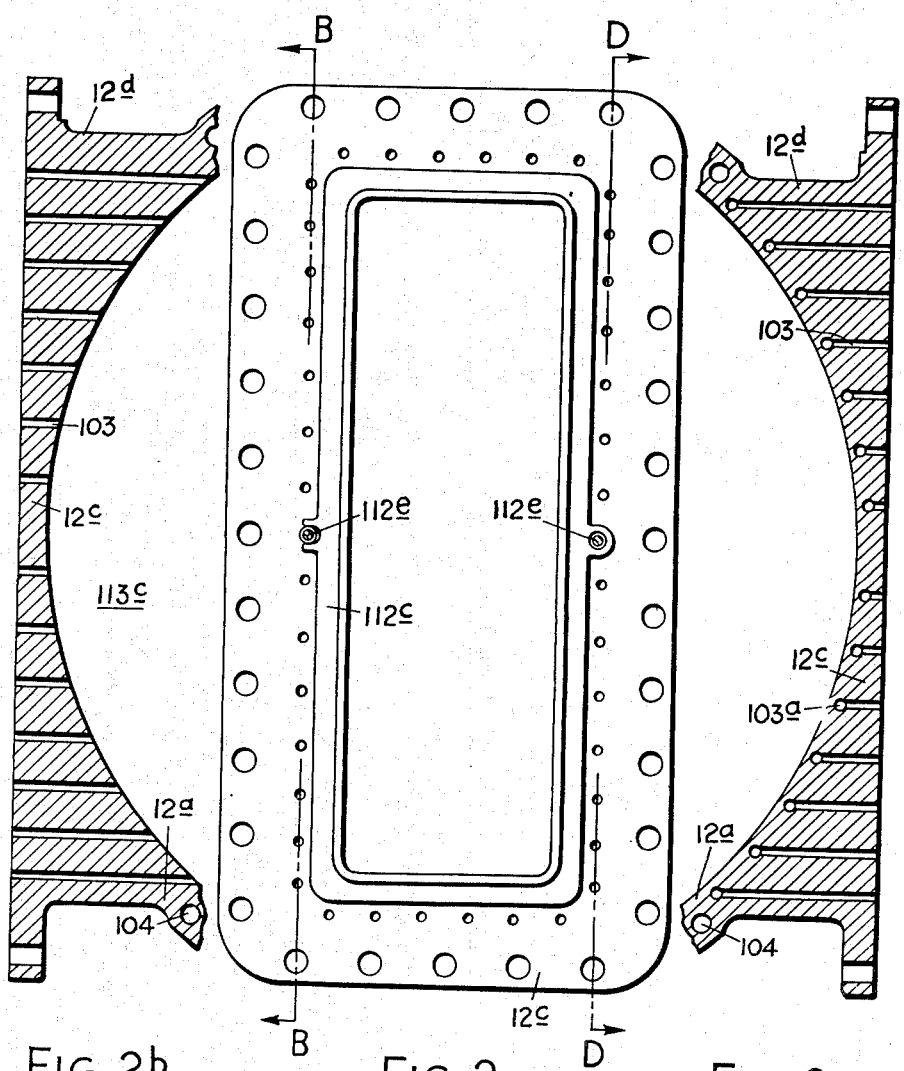

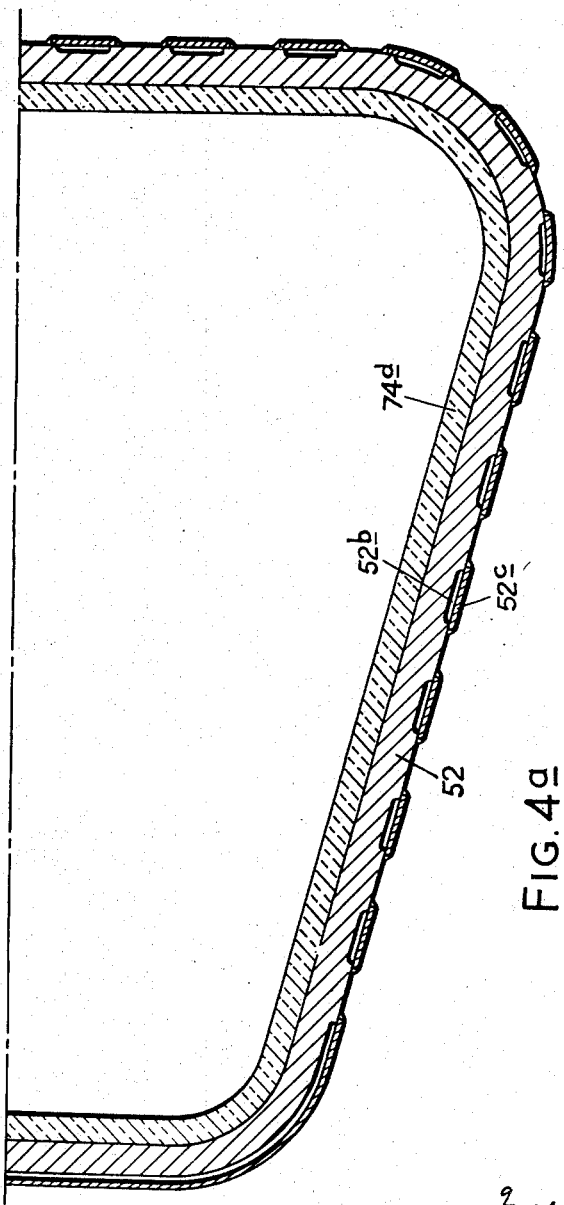

Patented Aug. 17, 1954

2,686,653

UNITED STATES PATENT OFFICE 2,686,653

STATOR COOLING OF GAS TURBINES

Adolf Frankel, Clifford Morris, and Paul Heinz Walter Wolff, Rugby, and Alec Burton Mitchell, Wimbledon, London, England, assignors to The English Electric Company Limited, London, England, a British company Application February 2, 1950, Serial No. 141,914

Claims priority, application Great Britain February 10, 1949

11 Claims. (Cl. 253—39.1)

The invention relates to a gas turbine set comprising a compressor and a turbine, the turbine driving the compressor, and the compressor supplying compressed air to the combustion chamber of the turbine. Usually a second turbine is provided which is mechanically independent of the compressor and its turbine, but either having a separate combustion chamber supplied with compressed air from the said compressor in parallel flow to the first mentioned turbine, or receiving the exhaust gases in series flow arrangement with the latter. This second turbine is adapted to deliver useful power.

A gas turbine set of the second kind is described in patent application Serial No. 76,335, filed on February 14, 1949, by L. J. Cheshire, A. Frankel and P. H. W. Wolff and assigned to The English Electric Co. Ltd. of London (Great Britain) and now abandoned, and while the present invention is not limited to that gas turbine set, the latter is a suitable example of how the present invention can be carried into effect.

It is a main object of the present invention to provide a gas turbine set wherein the outer casing of the turbine set and its gas inlet branches are kept at a temperature low enough to eliminate the necessity of using highly alloyed special heat resisting materials while not affecting the maximum working temperature in the thermodynamic cycle and thus the thermal efficiency of the gas turbine.

According to a main feature of the invention all the walls exposed to heat convection from the combustion gases flowing at high velocity and/or to heat radiation are cooled by a cooling fluid flowing either over the opposite side of the walls or through internal ducts in the walls arranged at such a distance from one another that the temperature variations in the wall between adjacent ducts are small enough not to cause any dangerous thermal stresses or distortions. This distance depends on the physical properties of the cooling medium and of the wall material, and on the heat inflow to which the said wall is exposed, and can be determined to suit any given design and operating conditions. A suitable example is that the distance between centers of the ducts is about five times the diameters thereof with a wall thickness of about three times the said diameters. In case of rectangular cross section of the ducts a suitable distance is about five times the diameter of a circular cross section of same cross section area.

Other objects and features of the invention will appear from the detailed description of an embodiment given in what follows by way of example and with reference to the accompanying drawings in which:

Fig. 1 is a longitudinal part section of the entrance chamber of a gas turbine of the type more fully described in patent application Serial No. 76,335, filed on February 14, 1949, by L. J. Cheshire, A. Frankel and P. H. W. Wolff and assigned to The English Electric Co. Ltd. of London (Great Britain) and now abandoned.

Fig. 2 is a lateral view of an entrance flange to the entrance chamber of Fig. 1, and Figs. 2a, b are sections on the lines D—D and B—B, respectively, of Fig. 2.

Fig. 4a is a section on line T—T of Fig. 4.

Figure 1:
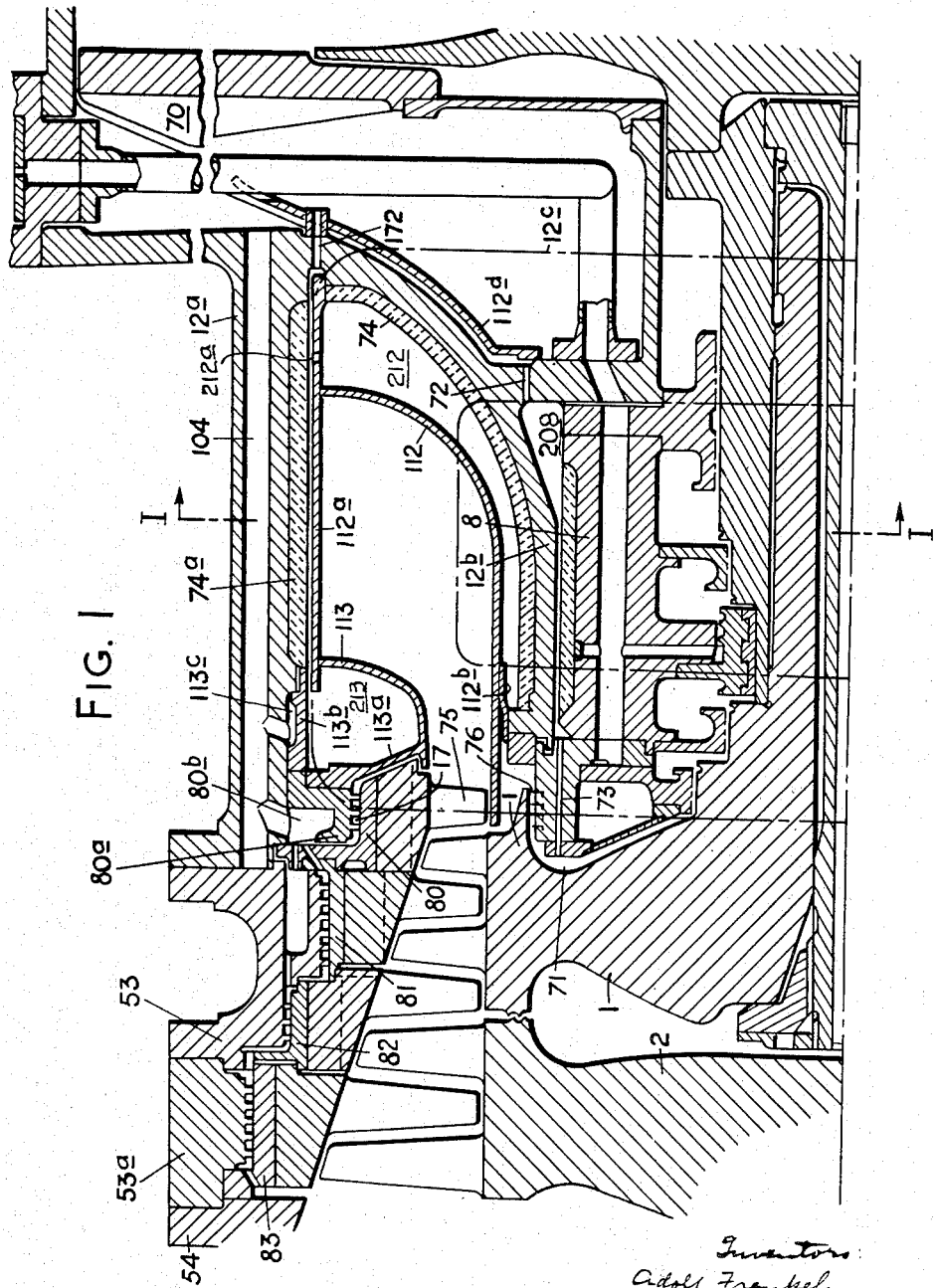

Fig. 1 shows how the annular outer portion 12a of the rigid casing and its curved annular inner portion 12b in radially spaced and overlapping relation to and forming a junction with the said outer portion are shielded from the scrubbing effect of the hot combustion gases, coming at high velocity from the combustion chambers (not shown), by internal ducts of a more heat resistant material than the casing itself, which ducts are however not exposed to any substantial pressure difference. Therefore they can be fabricated of thin special alloy sheet steel and of machined pieces by welding.

For example, the inner portion 12b, containing the bearing block 8, is shielded by a screen 112 consisting of a body of rotation adapted to the contour of the inner portion 12b, resiliently supported by an outer cylindrical portion 112a fitting with its edge into a recess of the rigid outer casing 12a, and by an inner cylindrical portion 112b attached to the end of the inner portion 12b. An air gap 208 is left between the outside of the said bearing block 8 and the inside of the said inner portion 12b.

The inner portion 12b, which together with the said bearing block 8 forms a boundary wall sealing the said turbine stator structure against the compressor diffuser chamber 70 forming the source of compressed air to the combustion chambers of the gas turbine, is moreover lagged against heat radiation by a layer of heat insulating material 74 and is on the side of the said compressor diffuser chamber 70 covered by a curved ring shaped guide baffle 112d following its contour, cooling air being passed between the wall of the inner portion 12b and the guide baffle 112d, then through a duct 72 into the annular space between the inner portion 12b and the bearing block 8, through a duct 73 into the space 71 adjacent the turbine rotor 1 and from there through the labyrinth gland 76 into the main gas stream between the first row of stator blades 75 and the first row of rotor blades of the turbine rotor 1.

The portion 12a of the rigid outer casing has two symmetrical flat rectangular flanges 12c (Figs. 2 and 3) for the attachment of the combustion chamber elbows 52 (Fig. 4), and flanged sleeves 112c (Fig. 3) of heat resistant alloy steel sheet are held between the flanges 12c and said elbows. The casing portion 12a and the sockets 12d connecting the same to the flanges 12c are internally lagged at 74a and 74b, respectively. The space between the outer surface of the cylindrical screen 112a and the lagging 74a of the casing portion 12a is in communication with the compressor diffuser chamber 70 through openings 172, but otherwise sealed, and forms an insulating stagnant air space.

A space 212 between the lagging 74 and the screen 112 is filled with stagnant air as a heat insulating medium, and is in communication with the said space between the screen 112a and the lagging 74a through a restricted opening 212a.

Another screen 113 is welded to the outer cylindrical screen 112a and to a flange 113a which is bolted to a ring member 80a centered in the rigid outer casing portion 12a. An annular space 213 in communication with the said space between the screen 112a and the lagging 74a is enclosed between said screen 113, said flange 113a, and a ring member 113b referred to hereinafter. The two screens 112 and 113 form together an annular nozzle leading the combustion gases from the elbows 52 of the combustion chambers (not shown) to the first row of stator vanes 75 which are fitted into a ring member 80, enclosing spiral grooves 17 for cooling air between its outer circumference and the inner circumference of the ring member 80a.

Similarly, ring members 81, 82 and 83 are centered in the annular portions 53, 53a of the rigid outer casing and mutually in one another. These ring members carry the other stator vanerings. The exhaust diffuser casing 54 is flanged and bolted to the ring members 53, 53a.

The ring member 113b is centered outside of the screen 113 in the portion 12a of the rigid outer casing so as to leave an annular recess 113c between the components 12a and 113b the use of which will be described later.

The compressor diffuser chamber 70 communicates with a number of cooling ducts 104 arranged, parallel to the axis of the gas turbine set, within the wall thickness of the single-walled portion 12a at regular intervals between the two flanges 12c. Diametrically opposite ducts 104 communicate with the annular space 113c as aforesaid, and with an annular space 80b surrounding the annular member 80a.

From the annular space 80b air is delivered to the helical grooves 17 surrounding the annular members 80, 81, 82 and 83, thus acting as a cooling medium and considerably reducing the transition of heat from the turbine stator vanes to the casing portion 12a and to the annular portions 53 and 53a. This stream of cooling air eventually mixes with the main gas stream at various stages of the turbine. For example the cooling air from the annular member 80 emerges upstream of the first row of stator blades 75, the air from the annular member 81 emerges between the second row of rotor blades of the turbine rotor 1 and the first row of stator blades for the turbine rotor 2, and the air from the annular members 82 and 83 emerges downstream of the second row of rotor blades of the turbine rotor 2.

Figures 3, 3A:
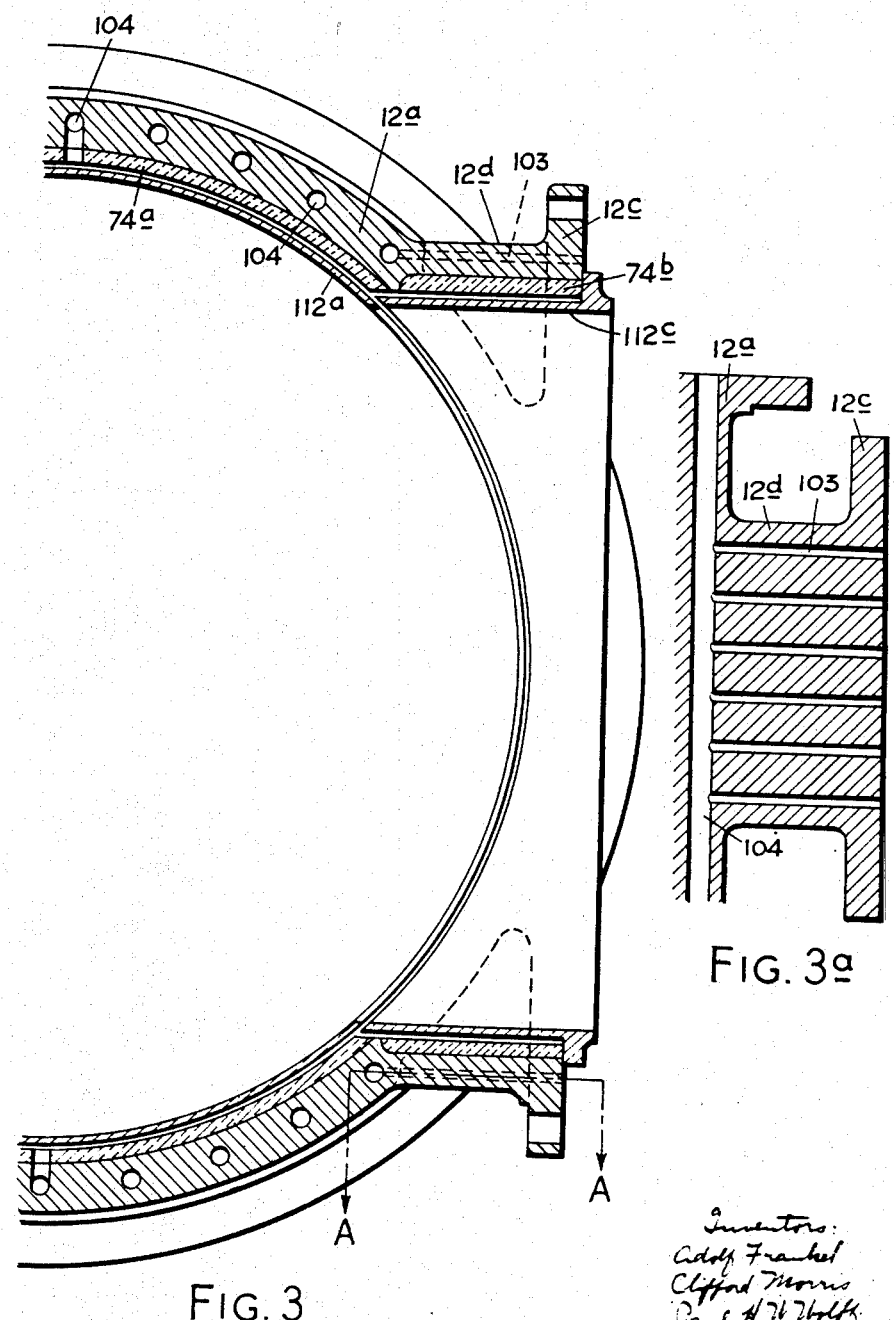
Fig. 3 is a part cross section on the line I—I of Fig. 1
Fig. 3a is a section on line A—A of Fig. 3.

Referring now to Figs. 2 to 3a, the flanges 12c for the connection of the rigid outer turbine casing portion 12a with the combustion chamber elbows are rectangular, the short sides of the rectangles being parallel and the long sides perpendicular to the axis of the gas turbine set. The rectangular sockets 12d connecting these flanges 12c to the casing portion 12a have a number of cooling air ducts 103 arranged in their walls extending at right angles to the planes of the flanges 12c. As seen in Figs. 3 and 3a, the ducts 103 at the short sides of the rectangular sockets 12d are in a direct communication with the adjacent ducts 104, while the ducts 103 on the long sides of the sockets 12d on the upstream side of the gas turbine set are in a direct communication with the compressor diffuser chamber 70 through short ducts 103a (Fig. 2a) running parallel to the ducts 104, and the ducts 103 on the downstream side of the sockets 12d are in connection with the annular space 113c (Figs. 1 and 2b) which is in connection with ducts 104 arranged in the meridional plane perpendicular to the plane of symmetry through the two flanges 12c.

Accordingly, air flowing through these ducts 104 into the annular space 113c has to pass circumferentially along this space before reaching the ducts 103, acting as a coolant all along this path.

It will be noted from Fig. 2 that the flanged sleeves 112c are secured to the flanges 12c by two dowel pins 112e, one of which has an easy fit in a hole of the flange of the sleeve 112c and the other engages an open slot therein, which allows free thermal expansion of the flange of sleeve 112c with respect to the rigid flange 12c.

The cooling air emerging from the ducts 103 may be eventually discharged into the main gas or air stream, so as to perform useful work in the gas turbine. This may be done, after using it for the cooling of components of the gas turbine set which are at higher temperature than the cooling air heated up by its previous action.

Figure 4:
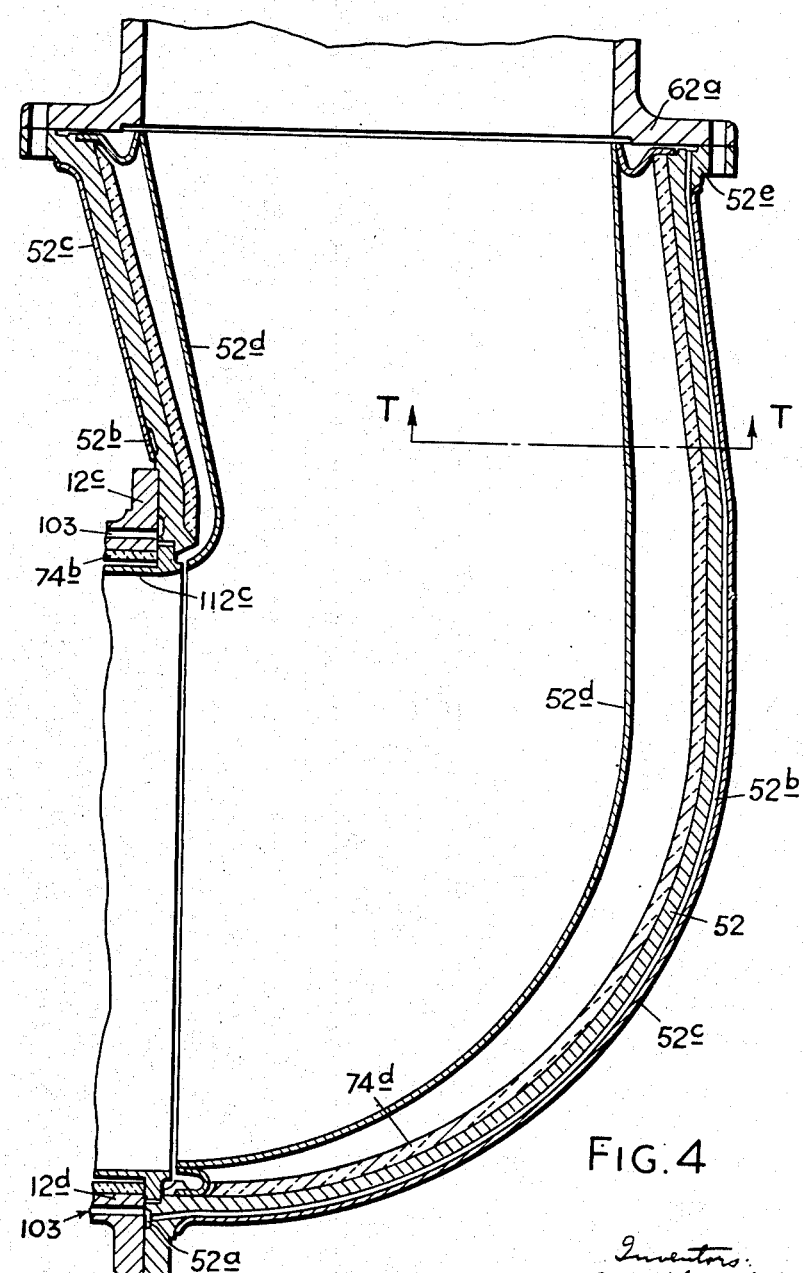
Fig. 4 is a section in the same plane as Fig. 3 through the elbow connecting a combustion chamber with the associated entrance to the compressor driving turbine as shown in Fig. 3.

Such components are for example the ducting means connecting the combustion chambers with flanges 12c of the entrance chamber, an embodiment of which in the shape of an elbow will now be described with reference to Figs. 4 and 4a.

Recesses 52a are provided in the flanges of the elbows 52 of the combustion chambers which communicate with the cooling air ducts 103 in the sockets 12d. These recesses 52a communicate with shallow grooves 52b provided in the outer surface of the elbows 52 which are closed by strips 52c welded on said outer surface. The cooling air emerging from the ducts 103 thus cools the elbows 52, and eventually emerges into the main gas stream between the flanges 52e of the elbows 52 and the flanges 62a of the combustion chambers (not shown). The elbows 52 have a pressure relieved heat-resistant screen 52d protecting it from the scrubbing action of the hot combustion gases and an internal lagging 74d protecting it from heat radiation. They may form a transition from a circular outlet from the combustion chamber to the rectangular inlet 12c of the rigid outer casing 12a of the gas turbine, Fig. 4a showing half of a trapezoidal intermediate section.

It will be noted from the foregoing description that the turbine casing and the gas inlet elbows do not contain any substantial wall area subject to heat inflow from the hot combustion gases which is not screened from scrubbing action, lagged against radiation, and cooled by the means described hereinabove. The criterion of arranging the cooling means both in the turbine casing in general and in the gas inlet elbows is the same as described specifically hereinabove with reference to the spacing of cooling ducts in the walls of the turbine entrance chamber, namely that the temperature variations occurring in the walls owing to the local disposition of screening, lagging and cooling and to the local heat inflow is small enough to prevent any excessive thermal stresses or distortions.

What we claim as our invention and desire to secure by Letters Patent is:

1. A stator structure for a gas turbine comprising in combination: an annular outer casing in operation supplied with motive combustion gases for the gas turbine, an annular inner portion of the said casing in radially spaced and overlapping relation to the said annular outer casing and forming a junction therewith, the said inner portion journalling a rotor of the gas turbine, the said outer casing and inner portion thereof having single-walled pressure resistant walls consisting of a metal having a comparatively low heat resistance, and single-walled screens of sheet metal having a comparatively high heat resistance arranged adjacent the said walls with spaces included between the sides of said screens facing towards said walls and the said walls, the said screens screening the said walls from the high speed high temperature combustion gases, the screen adjacent the said outer casing having an extension towards the said junction, the said spaces being in fluid communication with one another through a restricted opening located in the said extension, a grid of cooling ducts being arranged within the wall thickness of said single-walled outer casing parallel to the surface thereof, whereby the temperature of said outer casing is kept substantially below the temperature of said screens.

2. A stator structure for a gas turbine comprising in combination: an annular outer casing, an annular inner portion of the said casing in radially spaced and overlapping relation to the said outer casing and forming a junction therewith, ducting means connected to and in operation supplying the said casing with motive combustion cases for the gas turbine, both the said casing and ducting means having single-walled pressure resistant walls consisting of a metal having a comparatively low heat resistance, and single-walled screens of sheet metal having a comparatively high heat resistance arranged inside the said casing and ducting means with spaces included between the sides of the said screens facing towards said walls and the said walls, the said screens screening the said walls from the high speed high temperature combustion gases, the screen adjacent the said outer casing having an extension towards the said junction, the said spaces being in fluid communication with one another through a restricted opening in the said extension, a grid of cooling ducts being arranged in said single-walled walls of the said outer casing and ducting means parallel to the surfaces thereof, the distance between the centers of adjacent cooling ducts being in the order of five times the diameter of a circular area equivalent to the cross section area of each duct.

3. A stator structor as claimed in claim 2 comprising lagging means of low heat conductivity covering the surfaces of the said casing and ducting means facing the said screens, and spaced from the latter.

4. A stator structor as claimed in claim 2 comprising detachable elbows forming part of the said ducting means for the motive combustion gases, flat grooves being provided in the outer surface of the walls of said elbows and sheet metal strips welded to the said elbows covering the said flat grooves to form the cooling ducts thereof, the said cooling ducts being in fluid communication with the cooling ducts in the said outer casing.

5. A gas turbine comprising a rotor, and a stator structure including an annular outer casing, ducting means connected to and in operation supplying said casing with motive combustion gases for the gas turbine, a curved annular inner portion of the said casing in a radially spaced and overlapping relation to the said annular outer casing and forming a junction therewith, a bearing block housed in the said inner portion and spaced from the inner surface thereof by an annular gap, labyrinth glands arranged between the said bearing block and rotor, the said inner portion, bearing block and labyrinth glands forming together a boundary wall sealing the said turbine stator structure against an external source of compressed air at the side where the said rotor passes through the said casing, the said casing being single-walled and consisting of a pressure resistant metal of comparatively low heat resistance, single-walled screens of sheet metal of comparatively high heat resistance arranged adjacent the inner faces of said outer casing and inner portion thereof and screening the same from the high speed high temperature combustion gases, and lagging means of low heat conductivity covering the said inner faces of the said walls facing the said screens and spaced from the latter, a grid of cooling ducts being arranged within the thickness of the wall of the said single-walled outer casing parallel to the said inner faces thereof, bores being provided in the said casing and said inner portion thereof putting the said cooling ducts and the said annular gap, respectively, in fluid communication with said external source of compressed air.

6. A gas turbine as claimed in claim 5 comprising detachable elbows as part of the said ducting means for the motive combustion gases having walls consisting of a pressure resistant metal, cooling ducts being arranged in the said walls connected to and supplied with air from the cooling ducts in the said outer turbine casing and being in fluid communication with and discharging into the said ducting means for the motive combustion gases at points upstream to the connection of the said ducting means to the said outer casing.

7. A gas turbine as claimed in claim 5 wherein between the said single-walled pressure resistant outer turbine casing and inner portion thereof consisting of a metal of comparatively low heat resistance and the said single-walled sheet metal screens of comparatively high heat resistance air chambers are formed which are in fluid communication with the said external source of compressed air through a restricted opening in the said boundary wall and otherwise sealed, forming stagnant insulating air spaces.

8. A gas turbine comprising a stator structure including an annular outer casing, a turbine rotor having a disc rotatably arranged in the said casing adjacent one end thereof, ducting means connected to and in operation supplying said casing with motive combustion gases for the gas turbine, an annular inner portion of the said casing in radially spaced and overlapping relation to the said annular outer casing and forming a junction therewith adjacent the other end thereof, a bearing block housed in the said inner portion and spaced from the inner surface thereof by an annular gap, the said bearing block journalling the said turbine rotor, labyrinth glands arranged between the said bearing block and rotor, the said inner portion, bearing block and labyrinth glands together forming a boundary wall sealing the said turbine stator structure against an external source of compressed air, the said outer casing and inner portion thereof being single-walled and consisting of a pressure resistant metal of comparatively low heat resistance, single-walled screens of sheet metal of comparatively high heat resistance arranged adjacent the said casing and inner portion thereof, and screening the same from the high speed high temperature combustion gases, lagging means of low heat conductivity covering the inner faces of said outer casing and the inner portion thereof and facing the said screens and spaced from the latter, a grid of cooling ducts being arranged within the thickness of the wall of the said single-walled outer casing parallel to the inner surface thereof, the said cooling ducts and the said annular gap between the said bearing and the inner portion being supplied with cooling air under pressure from the external source of compressed air through a bore in the said inner portion, a pair of rectangular sockets located at opposite sides of the said casing diametrically opposite one another and having longitudinal and transverse walls integral with those of the said single-walled casing, the said sockets forming continuations of the said ducting means for the motive combustion gases, an annular member arranged inside said outer casing in juxtaposition to the transverse walls of the said sockets facing away from said junction defining an annular cavity between itself and its outer casing in fluid communication with the said cooling ducts in the said outer casing through bores therein, cooling ducts in the said longitudinal and transverse walls of the said sockets perpendicular to the center line of the gas turbine, the cooling ducts in that one of the transverse walls of the said sockets which is in juxtaposition to the said junction being in a direct fluid communication with the said external source of compressed air through bores in the said inner portion, and the cooling ducts in that one of the transverse walls of said sockets which is facing away from the said junction being in indirect fluid communication with the said cooling ducts in the wall of the said outer casing through said annular cavity.

9. A gas turbine comprising a stator structure having an annular outer casing, a turbine rotor having a disc rotatably arranged in the said casing adjacent one end thereof, ducting means connected to and in operation supplying said casing with motive combustion gases for the gas turbine, an annular inner portion of the said casing in radially spaced and overlapping relation to the said outer casing and forming a junction therewith adjacent the other end thereof, a bearing block housed in the said inner portion and spaced from the inner surface thereof by an annular gap, the said bearing block journalling the said turbine rotor, labyrinth glands arranged between said bearing block and rotor, the said inner portion, bearing block and labyrinth glands forming together a boundary wall sealing the said turbine stator structure against an external source of compressed air at the side where the said rotor passes through said outer casing, the said outer casing and inner portion thereof being single-walled and consisting of pressure resistant metal of comparatively low heat resistance, single-walled screens of sheet metal of comparatively high heat resistance arranged adjacent the inner face of said casing and inner portion thereof and screening the same from the said high speed high temperature combustion gases, lagging means of low heat conductivity covering the said faces facing the said screens and spaced from the latter, a grid of cooling ducts being arranged within the thickness of the wall of the said single-walled outer casing parallel to the inner surface thereof, the said cooling ducts and the said gap between the said bearing block and the said inner portion being supplied with cooling air under pressure from the said external source of compressed air through a bore in the said inner portion, a pair of rectangular sockets located at opposite sides of the said casing diametrically opposite one another and having walls longitudinal and walls transverse with respect to the turbine axis and integral with the walls of the said single-walled casing, said sockets forming continuations of the said ducting means for the motive combustion gases, an annular member arranged inside the said outer casing in juxtaposition to the transverse walls of said sockets facing away from said junction defining an annular cavity between itself and the said outer casing in fluid communication with the said cooling ducts in said outer wall through bores therein, cooling ducts in the longitudinal and transverse walls of the said sockets perpendicular to the center line of the gas turbine, the said cooling ducts in each of the said longitudinal walls being in direct fluid communication with a cooling duct in the said single-walled casing, the said cooling ducts in that one of the transverse walls which is in juxtaposition to the said junction being in direct fluid communication with the said external source of compressed air through bores in the said casing, and the said cooling ducts in that one of the transverse walls which is facing away from said junction being in indirect fluid communication with the said cooling ducts in the said single-walled outer casing through said annular cavity.

10. A gas turbine as claimed in claim 9 wherein the said annular cavity is in direct fluid communication with the said cooling ducts in the said outer casing at two diametrically opposite points of the said casing, and is in fluid communication at points lying between the said diametrically opposite points with the cooling ducts in those of the transverse walls of the said sockets which are facing away from the said boundary wall.

11. A gas turbine as claimed in claim 5 comprising a curved ring shaped guide baffle following the contour of the outside face of the said curved inner portion of the casing, leaving a gap between the outer circumference of said baffle and the outside face of the said inner portion of the casing open to the said source of compressed air, and at the inner circumference of said baffle being in fluid communication with the annular gap between the said inner portion and the said bearing block through a restricted opening in the said inner portion of the casing.

References Cited in the file of this patent

UNITED STATES PATENTS

| Number | Name | Date |
|---|---|---|
| 1,778,126 | Sedlmeir | Oct. 14, 1930 |
| 2,215,532 | Richardson | Sept. 24, 1940 |
| 2,244,467 | Lysholm | June 3, 1941 |
| 2,341,664 | Schutte | Feb. 15, 1944 |
| 2,414,788 | Altorfer | Jan. 28, 1947 |
| 2,434,901 | Buck | Jan. 27, 1948 |
| 2,442,019 | Ray | May 25, 1948 |
| 2,487,514 | Boestad | Nov. 8, 1949 |
| 2,529,946 | Imbert | Nov. 14, 1950 |